2,885,402

PRODUCTION OF PIPERIDINES

Alexander F. MacLean and Adin L. Stautzenberger, Corpus Christi, Tex., assignors to Celanese Corporation of America, New York, N.Y., a corporation of Delaware No Drawing. Application April 1, 1953
Serial No. 346,258

4 Claims. (Cl. 260—293.2)

This invention relates to the preparation of piperidines and relates more particularly to the preparation of piperidine or substituted piperidines from compounds having two carbonyl groups separated by three carbon atoms.

It is an object of this invention to provide a new and improved method for the production of piperidine and substituted piperidines.

A further object of this invention is the provision of a novel method for the economical preparation of piperidine and substituted piperidines in high yields from readily available starting materials.

Other objects of this invention will be apparent from the following detailed description and claims.

According to this invention, a compound having two carbonyl groups selected from the class consisting of aldehyde and ketone groups separated by three carbon atoms, which compound is hereinafter designated as a dicarbonyl compound, is reacted with ammonia or a primary amine to yield piperidine or a substituted piperidine. The reaction may be illustrated by the equation:

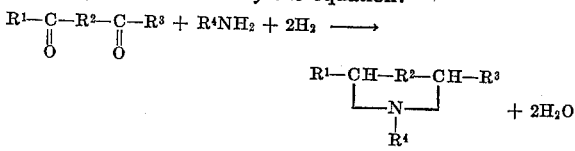

in which $R^1$, $R^3$ and $R^4$ represent substitutents which may be the same or different, such as hydrogen or hydrocarbon or substituted hydrocarbon groups, and in which $R^2$ represents the trimethylene group, $-CH_2-CH_2-CH_2-$, or a substituted timethylene group.

In one method of practicing this invention the dicarbonyl compound is subjected to liquid ammonia or amine and hydrogen gas under pressure in the presence of a hydrogenation catalyst. This reaction may be carried out conveniently by charging an autoclave with the dicarbonyl compound, catalyst and liquid ammonia or amine, supplying thereto an exceess of hydrogen gas under pressure, sealing the autoclave, and heating the autoclave with agitation. Due to the consumption of part of the hydrogen gas during the reaction the pressure in the autoclave diminishes as the reaction proceeds. In another method, the pressure in the autoclave is maintained at a substantially constant value throughout the duration of the reaction by continuously supplying hydrogen gas from a suitable source to the reactants while the reaction is going on.

The temperature and pressures at which the reaction is carried out may be varied over a wide range. However, best results are obtained at temperatures of about 100 to 200° C. and pressures of about 1000 to 5000 pounds per square inch. The proportions of the reactants may also be varied widely, although it is desirable to employ at least one mole of ammonia or amine and two moles of hydrogen for each mole of the dicarbonyl compound. Optimum results are obtained when there are present in the reaction mixture about 2 to 20 moles of ammonia or amine per mole of dicarbonyl compound and when the partial pressure of hydrogen in the system is at least about 1000 pounds per square inch.

For best results the reaction is carried out in the presence of a hydrogenation catalyst, such as a catalyst of the ferrous metal group, for example, Raney nickel or Raney cobalt. This catalyst may be employed as such or in the form of a coating on a suitable carrier, for example, a coating of nickel on a finely divided carrier made of silica, alumina or magnesia. If desired, the reaction of the dicarbonyl compound with the ammonia or amine and hydrogen may be carried out in the presence of a suitable solvent, e.g. methylal, dioxan, methanol or 1,5-diaminopentane. When the solvent is 1,5-diaminopentane it also takes part in the reaction, as will appear below.

Besides piperidine or substituted piperidines, other compounds such as diamines and diols are produced in minor amounts during the reaction of this invention. We have found that there is an equilibrium in the reaction mixture between the diamine produced by the reaction, the piperidine or substituted piperidine and the ammonia or amine. Accordingly, part or all of the diamine recovered from the reaction products may be employed to produce more piperidine or substituted piperidine by adding said diamine to the reaction mixture of dicarbonyl compound, hydrogen and ammonia or amine. By this recycling procedure the overall yield of piperidine or substituted piperidine may be increased substantially. The diamine recovered from the reaction products may also be converted to piperidine or a substituted piperidine by a vapor phase pyrolysis treatment.

In the process of this invention, it is desirable, of course, to use reactants whose substituents, if any, do not materially interfere with the course of the reaction. For instance, specific dicarbonyl compounds which may be employed include glutaraldehyde, 1-, 2- or 3-methyl glutaraldehyde, and other substituted glutaraldehydes such as the lower alkyl- or chloro-substituted glutaraldehydes, 1,5 aldehydo ketones, such as 5-hexanonal and substitution products thereof, and diketones, such as 2,6-heptanedione and its substitution products, e.g. the lower alkyl- and halogen-substituted 2,6-heptanediones. When a primary amine is employed as a reactant, the $NH_2$ group of said amine may be attached to a carbon atom which is aliphatic, heterocyclic or aromatic. For example, the primary amine may be methyl amine, ethyl amine, ethanolamine, aniline or pyridylamine.

In order to further illustrate this invention, but without being limited thereto, the following example is given.

*Example*

A mixture containing 86 parts by weight (0.86 mole) of glutaraldehyde, 170 parts by weight (10 moles) of liquid ammonia and 5 parts by weight of an active Raney nickel slurry comprising 3.5 parts by weight of nickel and 1.5 parts by weight of methanol are heated and agitated in a stainless steel autoclave under a pressure of 2100 pounds per square inch of hydrogen gas for 2 hours at a temperature of 175° C., said temperature and pressure being maintained throughout the 2 hour period. The resulting crude reaction product is then removed from the autoclave, diluted with 100 parts by weight of water and distilled in a fractional distillation column. The piperidine-water azeotrope, which distills off first, is mixed with benzene and distilled again to remove the water in the form of a water-benzene azeotrope, following which the remaining benzene is removed by further distillation, leaving behind the piperidine. This piperidine is then purified by distillation at 105° to 107° C. The residue remaining after the removal of the piperidine-water azeotrope from the diluted crude reaction product is separated into its components by first removing the water by distillation and then distilling off 1,5-diaminopentane and 1,5-dihydroxypentane under reduced pressure. There are obtained 43 parts by weight (0.51 mole) of piperidine, 17 parts by weight (0.17 mole) of 1,5-diaminopentane, 11 parts by weight (0.11 mole) of 1,5-dihydroxypantane and 8 parts by weight of a high boiling residue.

It is to be understood that the foregoing detailed description is given merely by way of illustration and that many variations may be made therein without departing from the spirit of our invention.

Having described our invention what we desire to secure by Letters Patent is:

1. Process for the production of piperidine which comprises heating a mixture of glutaraldehyde, ammonia, and hydrogen in the presence of a hydrogenation catalyst, while maintaining a superatmospheric pressure of hydrogen.

2. Process for the production of piperidine which comprises heating a mixture of glutaraldehyde, ammonia, and hydrogen in the presence of Raney nickel catalyst, while maintaining a superatmospheric pressure of hydrogen.

3. Process for the production of piperidine which comprises heating a mixture of one mole of glutaraldehyde, about 2 to 20 moles of liquid ammonia, and hydrogen gas under a pressure of 1000 to 5000 pounds per square inch in the presence of Raney nickel and separating piperidine from the resulting product.

4. Process for the production of piperidine which comprises heating 0.86 mole of glutaraldehyde, 10 moles of liquid ammonia, and an excess of hydrogen gas under a pressure of 2100 pounds per square inch for 2 hours at 175° C. in the presence of Raney nickel, adding water to the resulting mixture and distilling off an azeotrope of piperidine and water.

References Cited in the file of this patent
UNITED STATES PATENTS

| | | |
|---|---|---|
| 2,018,680 | Lazier | Oct. 29, 1935 |
| 2,045,574 | Adkins | June 30, 1936 |
| 2,479,815 | Craig | Aug. 23, 1949 |
| 2,528,978 | Smith | Nov. 7, 1950 |
| 2,546,018 | Smith | Mar. 20, 1951 |

FOREIGN PATENTS

| | | |
|---|---|---|
| 663,294 | Great Britain | Dec. 19, 1951 |

OTHER REFERENCES

Maier: Das Pyridine und seine derivate, p. 6 (1934).

Hollis: Synthesis of Nitrogen Ring Compounds, pp. 210, 211 (1924).